US007062842B2

(12) United States Patent
Cassese et al.

(10) Patent No.: US 7,062,842 B2
(45) Date of Patent: Jun. 20, 2006

(54) DEVICE FOR DETECTING POSITIONING OF A STAPLE FOR A FRAME ASSEMBLING MACHINE, AND METHOD FOR USING SAID DEVICE

(75) Inventors: Pierre Cassese, Saint Ouen en Brie (FR); Alain Cassese, Breau (FR); Jean Cassese, Lieusaint (FR); Philippe Cassese, Saint Germain Laxis (FR)

(73) Assignee: Cassese Societe Anonyme, Verneull l'Etang (FR)

( * ) Notice: Subject to any disclaimer, the term of this patent is extended or adjusted under 35 U.S.C. 154(b) by 191 days.

(21) Appl. No.: 10/250,917

(22) PCT Filed: Dec. 10, 2001

(86) PCT No.: PCT/FR01/03893

§ 371 (c)(1),
(2), (4) Date: Dec. 1, 2003

(87) PCT Pub. No.: WO02/055274

PCT Pub. Date: Jul. 18, 2002

(65) Prior Publication Data

US 2004/0074943 A1 Apr. 22, 2004

(30) Foreign Application Priority Data

Jan. 12, 2001 (FR) .................................. 01 00378

(51) Int. Cl.
*B23P 15/24* (2006.01)
*B23P 15/12* (2006.01)

(52) U.S. Cl. .................... 29/707; 29/407.1; 29/407.01; 29/709; 29/715; 29/712; 227/2

(58) Field of Classification Search .................... 227/2, 227/8; 29/716, 407.08, 709
See application file for complete search history.

(56) References Cited

U.S. PATENT DOCUMENTS 4,421,264 A * 12/1983 Arter et al. .................... 227/2

* cited by examiner

*Primary Examiner*—Marc Jimenez
*Assistant Examiner*—Christopher Agrawal
(74) *Attorney, Agent, or Firm*—Finnegan, Henderson, Farabow, Garrett, & Dunner, L.L.P.

(57) ABSTRACT

A spring (18) is interposed between the sliding carriage (6) carrying a hammer (13) for driving-in and the actuator rod. The spring is mounted on the head (15) of a push rod, which carries a push contact (16) surrounded by an insulating washer (17). A O pad (20) is housed in the central opening of another insulating washer (19) supported by the spring. These detection means are activated when the spring is compressed in response to the stapling effort required at the moment when a staple comes up against the frame mouldings to be assembled. Application in frame-assembling machines.

5 Claims, 3 Drawing Sheets

DEVICE FOR DETECTING POSITIONING OF A STAPLE FOR A FRAME ASSEMBLING MACHINE, AND METHOD FOR USING SAID DEVICE

The invention is situated in the technical field of frame-assembling machines and relates more specifically to a device for detecting engagement of a staple against the mouldings being stapled, and to a method of using it.

Frame-assembly machines are known to comprise a work surface, on which the workpiece is positioned, and a movable mechanism which is arranged mainly beneath the said work surface and which serves to cause a hammer to act in an upwards direction. The hammer passes through a stapling bar holding the frame or moulding, and the movement of the hammer is subject to a contrary movement of a press projecting above the work surface, the function of which is to hold the frame in place and to act as an abutment for the hammer. The staples, provided from a bar of staples or magazine, are brought to the level of the table in a dispensing head located perpendicular to the hammer.

In known machines of that kind there is no reliable and efficient system which provides certainty that a staple has been correctly inserted at the location in question. For that it would be necessary to be certain of the number of staples contained in a magazine so that they could be counted out precisely and, as a result, to be certain that they had been correctly applied. However, that number is known only to within a few staples. It would also be possible to measure the length of the bars of staples in order to ascertain their number, but for that a precise measuring device, which would be awkward to use, would be needed.

These difficulties have led the Applicant to devise and implement a device allowing the engagement of a staple against the mouldings being stapled to be detected automatically, which device is no longer based on verification of the presence of the applied staple or absence of a staple at the application site but on detection of the effort required of the drive unit of the machine in order to drive the staple into the mouldings.

Accordingly, the invention relates principally to a device for detecting the engagement of a staple, for a frame-assembling machine, comprising a stapling bar accommodating a staple-dispensing head and also a carriage sliding in a vertical direction below the said bar along guide columns, and carrying a hammer for driving in the staple, the said carriage being moved by the rod of an actuator, according to which device a spring is interposed between the sliding carriage and the rod of the actuator, and according to which device the said spring is associated with detection means and activates those means in response to the stapling effort required when a staple comes up against the frame mouldings to be assembled.

Advantageously, the spring is a spring having non-touching turns which is mounted on the head of a push rod whose bottom region is connected to the rod of the actuator. The detection means comprise, on the one hand, a push contact located on that head and surrounded by an insulating washer and, on the other hand, a pad housed in the central opening of another insulating washer supported by the spring.

The invention relates also to a method of using the device, according to which, firstly, the actuator is activated at reduced speed until the staple has come up against the mouldings of the frame at a slow speed so as not to blunt the sharp wire of the staple, and according to which, secondly, the machine accelerates the upstroke of the actuator for complete insertion of the staple.

Other specific characteristics and advantages of the invention will emerge from a reading of the following description of an exemplary embodiment, referring to the accompanying drawings, in which.

Figure 1:
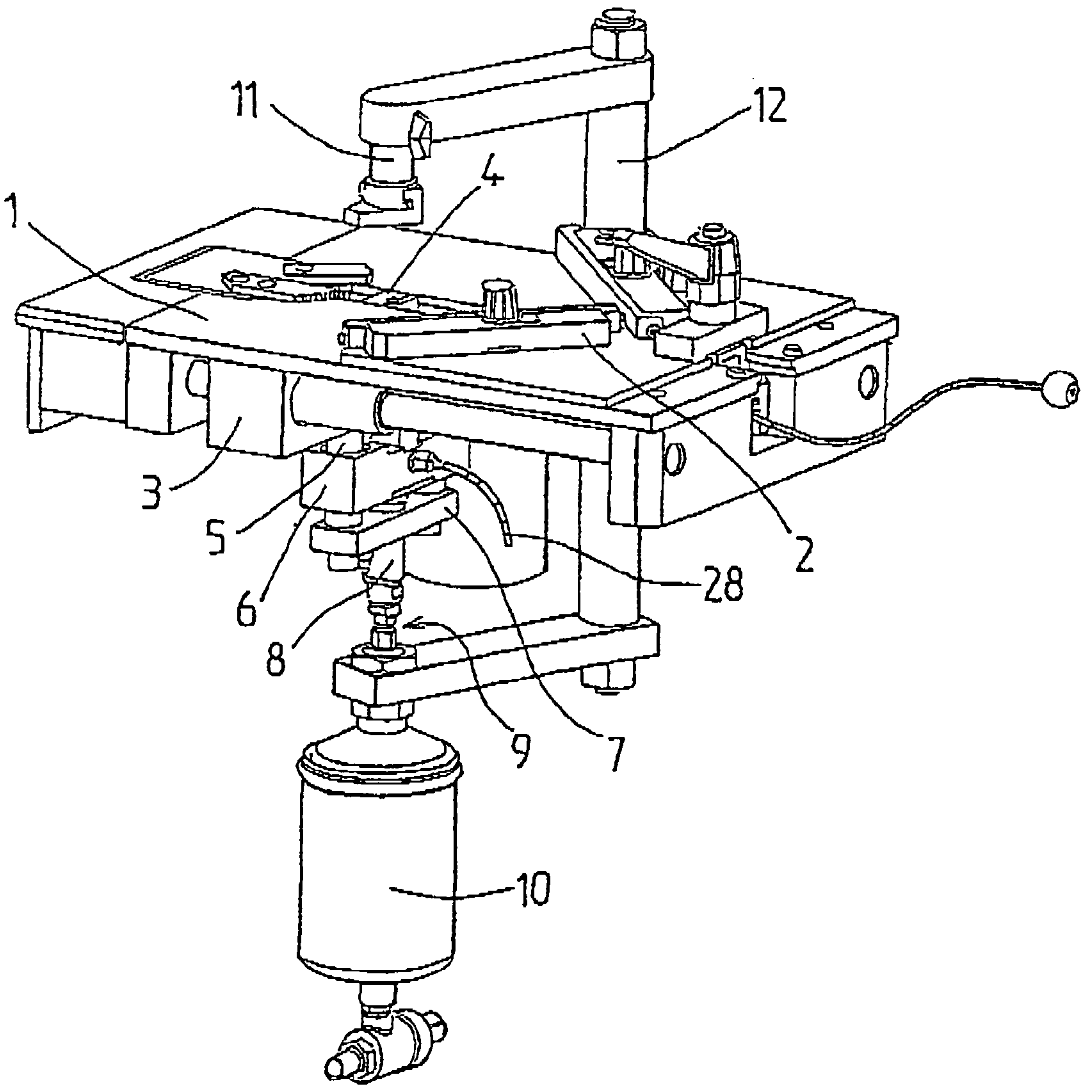
FIG. 1 is a general perspective view of the assembly machine.

FIG. 1 shows an assembly machine comprising a work surface 1, on which the mouldings rest, supported against adjustable stops 2. Underneath the work surface there is fixed a stapling bar 3 accommodating a staple-dispensing head 4 flush with the top of the work surface. Also underneath the work surface there are likewise fixed guide columns 5 for a carriage 6 sliding in a vertical direction, the travel of which is limited by a bottom stop 7. A push rod 8, which moves through a central opening in the bottom stop, is connected, in its lower region, to the rod 9 of a suspended actuator 10, whose vertical movement in an upwards direction or in a downwards direction is transmitted, by way of a post 12, to a press 11 located above the work surface.

Figure 2:
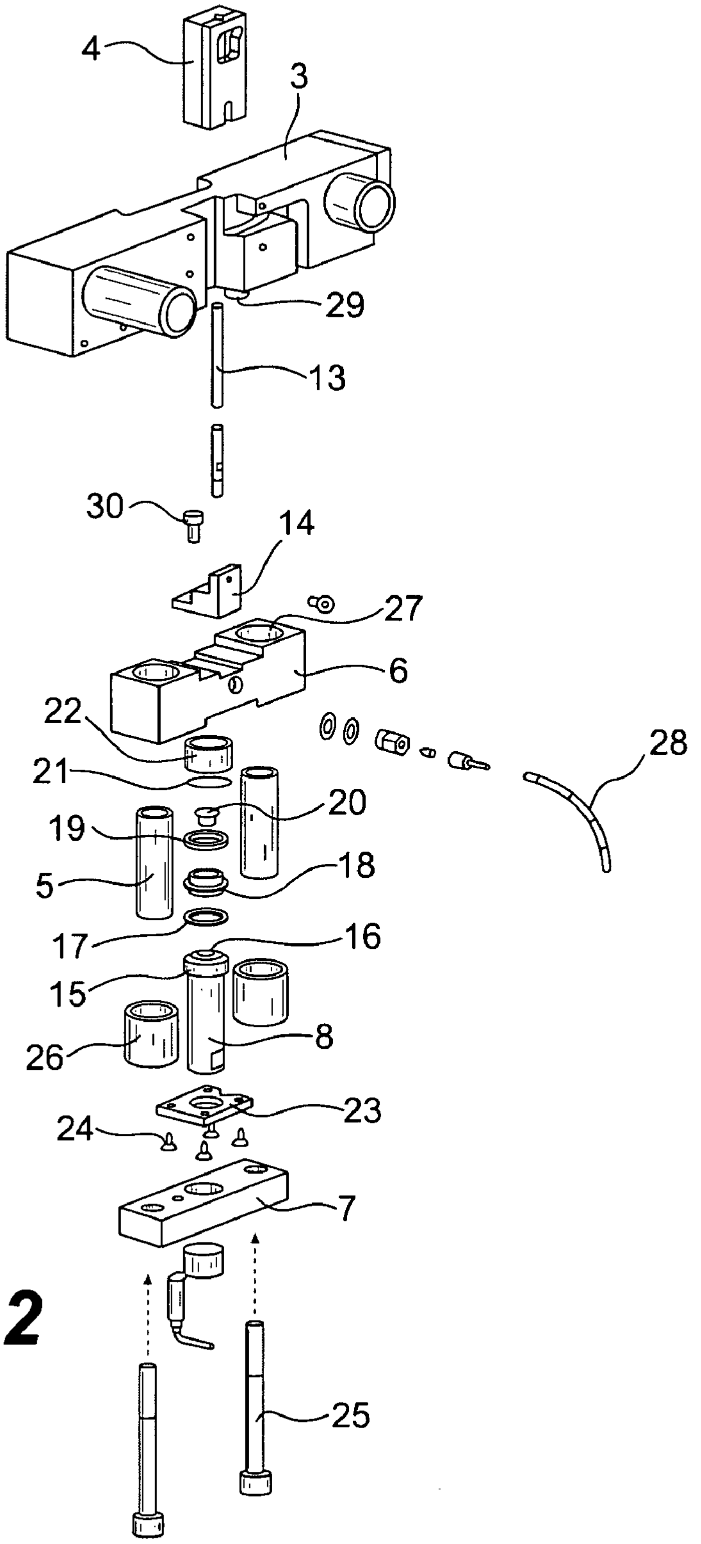
FIG. 2 is an exploded perspective view of the engagement-detecting device.

It can be seen more precisely from FIG. 2 that a hammer 13 is capable of passing through the dispensing head 4 located in the stapling bar 3. The hammer, which serves to drive in the staple, is itself fixed on a hammer support 14 mounted on the sliding carriage 6.

At the top of the push rod 8 is a head 15 carrying a push contact 16 surrounded by an insulating washer 17. A spring 18 having non-touching turns, which can consequently be compressed, rests on top of that washer 17 and itself supports another insulating washer 19 provided with a central opening in which is housed a pad 20. The washer is covered by an insulating disc 21. The push head 15 and its accessories slide inside a guide sleeve 22 mounted underneath the sliding carriage 6. In addition, a closure plate 23 is likewise fixed, by means of screws 24, in an appropriate recess in the sliding carriage. The spring 18 is accordingly interposed between the sliding carriage 6 and the rod 9 of the actuator. At the bottom of FIG. 2 there can be seen fixing screws 25, which pass through the bottom stop 7 and the columns 5 (which are housed in guide bushes 26 located in lateral openings 27 in the sliding carriage 6) and allow the entire unit to be fixed to the stapling bar 3. An electrical connection cable 28 is mounted on the side of the sliding carriage and is connected to the pad 20.

Finally, an end-of-travel sensor 29 is located underneath the stapling bar 3.

Figure 3:
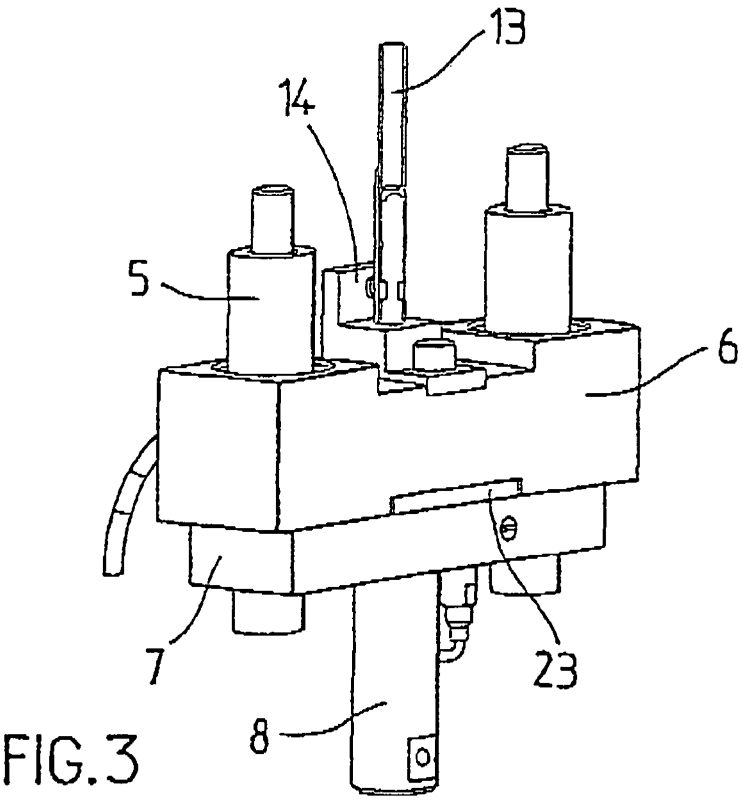
FIGS. 3 and 4 are perspective views of the sliding carriage and the push rod in lowered and raised positions, respectively.

After having positioned the mouldings to be stapled on the work surface 1 and having confirmed the location of the staple magazine in the dispensing head, the stapling operation may be started. The sliding carriage 6 is then in the position shown in greater detail in FIG. 3, in which it is resting against the bottom stop 7. The push rod 8 accordingly projects out below the bottom stop whilst the guide columns 5 extend out above the sliding carriage. The hammer 13, mounted on its support 14, is accordingly in its lowered position at the level of the bottom of the dispensing head.

Figure 4:
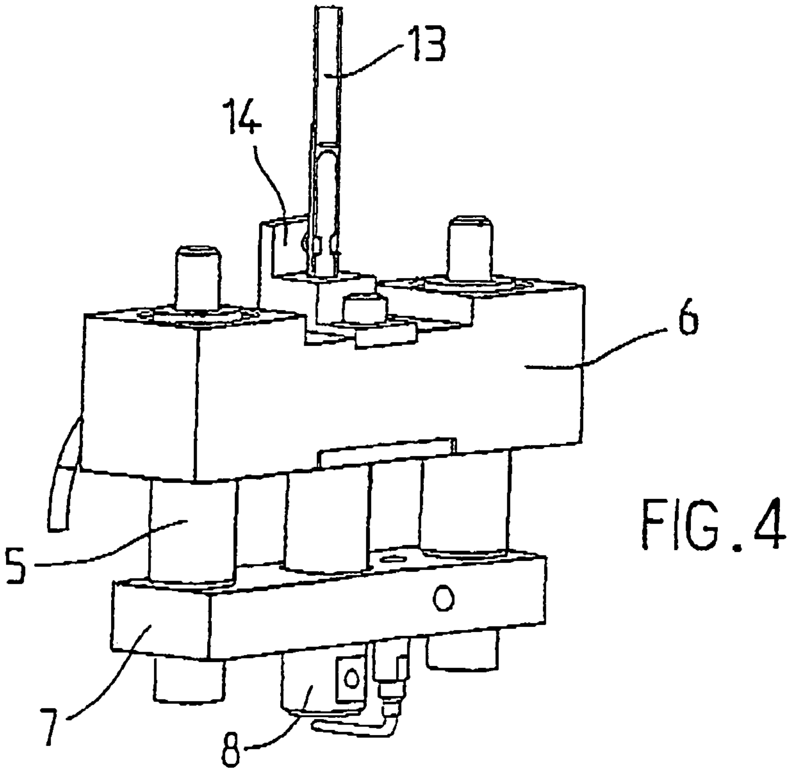

In order to be certain of the application of a staple, the actuator 10 is activated, at reduced speed, which has the effect of causing the rod 9 to move out from the actuator 10. In response, the post 12 starts to move in a contrary, descending direction, which has the effect of bringing the press 11 to rest on the mouldings. On continuation of its travel, the rod 9 of the actuator 10 brings about, by way of the spring 18 and the push rod 8, the upstroke of the sliding carriage 6. The push rod has accordingly slid through the bottom stop 7 and lifted the sliding carriage 6 until the hammer 13 reaches a staple and pushes it against the mouldings to be assembled. The resistance offered by the mouldings to penetration by the staple is transferred, by way of the hammer 13 and the sliding carriage 6, to the spring 18 interposed between the carriage and the push rod 8. The spring is compressed, thereby causing the washers 17 and 19 to come together, which ensures that the pad 20 comes into contact with the push contact 16 mounted on the head 15. In other words, the detection means, comprising the pad 20 and the contact 16, are activated in response to the stapling effort required when a staple comes up against the frame mouldings to be assembled, that being done at a slow speed so as not to blunt the sharp wire of the staple. This facilitates subsequent penetration by the staple, which follows a highly rectilinear and better targeted path, without subsequent deformation. The signal received accordingly corresponds to detection of the engagement of a staple to the mouldings. On receiving that signal, the machine accelerates the upstroke of the actuator 10. Complete insertion of the staple is accomplished by virtue of the continued deployment of the rod 9 of the actuator and the upstroke of the hammer 13, whilst benefiting from the effect of squeezing exerted between the hammer and the press 11. The sliding carriage 6 then comes to the maximum raised position shown in FIG. 4, in which the staple is fully driven into the mouldings. At that moment, the carriage 6 comes into contact with the sensor 29, which causes the actuator to stop and the sliding carriage to return to its initial position shown in FIG. 3. The device provides security of assembly because it is difficult to see a driven-in staple with the naked eye. The machine is then ready for application of a new staple.

In the event of a staple being absent at the moment of application, because the staple magazine is empty or because there is an anomaly in the positioning of the staple in the dispensing head, the upstroke of the sliding carriage 6 will be carried out until it arrives at the end of its travel, which is detected by the sensor 29. However, because there has been no effort of driving in the staple, the spring 18 will not have been compressed and an engagement signal will not have been emitted by the detector 20. That absence of a signal is accordingly an immediate indication of the absence of a staple, the detection of which wilt allow the machine to recommence the application operation at the same location after it has been reloaded. By virtue of this reliable system, it is accordingly impossible that a frame will lack any staples.

The described device likewise allows the application of a second staple as an extension to driving a first staple into the wood, this being necessary for the assembly of relatively thick mouldings. When the facetted region of the second staple comes up against the flat region of the first, the spring 18 is compressed, as in the previous case, and the signal of engagement is emitted in normal manner. The second staple then pushes the first into the mouldings and takes its place in the slot created in the wood, which serves as a guide for it and prevents it from being driven in to the side of the first.

Operation for the application of a second staple is, accordingly, entirely identical to that of the first and, if a staple is absent, that is detected in corresponding manner.

The invention claimed is:

1. A device for detecting the engagement of a staple, for a frame-assembling machine, comprising a stapling bar accommodating a staple-dispensing head and also a carriage sliding in a vertical direction below said bar along guide columns, and carrying a hammer for driving in the staple, said carriage being moved by a rod of an actuator, wherein a spring is interposed between the sliding carriage and the rod of the actuator; and said spring is associated with means for detecting and activates those detecting means in response to the stapling effort required when a staple comes up against the frame moldings to be assembled.

2. The detection device according to claim 1, wherein the spring is a spring having non-touching turns which is mounted on a head of a push rod whose bottom region is connected to the rod of the actuator; and the detecting means comprising, a push contact located on that head and surrounded by an insulating washer and, a pad housed in a central opening of another insulating washer supported by the spring.

3. The detection device according to claim 1 or 2, wherein the head of the push rod slides in a guide sleeve mounted under the sliding carriage.

4. The detection device according to claim 1 or 2, wherein an electrical connection cable is mounted on a side of the sliding carriage and is connected to the pad.

5. A method of using the device of claim 1 for detecting the engagement of a staple, comprising: firstly, activating the actuator at reduced speed until the staple has come up against the moldings of the frame so as not to blunt a sharp wire of the staple; and, secondly, on receiving an engagement detection signal, accelerating the upstroke of the actuator for complete insertion of the staple.

* * * * *